(12) United States Patent
Kim et al.

(10) Patent No.: US 8,582,960 B2
(45) Date of Patent: Nov. 12, 2013

(54) STORAGE MEDIUM STORING MOVING-IMAGE DATA THAT INCLUDES MODE INFORMATION, AND REPRODUCING APPARATUS AND METHOD

(75) Inventors: Kwang-min Kim, Anyang-si (KR); Kil-soo Jung, Hwaseong-si (KR); Man-seok Kang, Suwon-si (KR); Sung-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 382 days.

(21) Appl. No.: 12/964,627

(22) Filed: Dec. 9, 2010

(65) Prior Publication Data

US 2011/0081128 A1 Apr. 7, 2011

Related U.S. Application Data

(63) Continuation of application No. 10/964,811, filed on Oct. 15, 2004, now Pat. No. 8,280,231.

(30) Foreign Application Priority Data

Oct. 17, 2003 (KR) ................................ 2003-72504

(51) Int. Cl.
*H04N 5/84* (2006.01)
*H04N 5/89* (2006.01)

(52) U.S. Cl.
USPC .......................................... 386/332; 386/336

(58) Field of Classification Search
USPC .............................................. 386/332–336
See application file for complete search history.

(56) References Cited

U.S. PATENT DOCUMENTS 5,862,107 A 1/1999 Goto
5,909,551 A 6/1999 Tahara et al.
(Continued)

FOREIGN PATENT DOCUMENTS

EP 1 256 954 11/2002
EP 1 267 352 12/2002
(Continued)

OTHER PUBLICATIONS

Japanese Office Action issued on Aug. 31, 2010, in corresponding Japanese Patent Application No. 2006-535269 (4 pages).

(Continued)

*Primary Examiner* — Thai Tran
*Assistant Examiner* — Nigar Chowdhury
(74) *Attorney, Agent, or Firm* — NSIP Law

(57) ABSTRACT

A method of reproducing moving-image information recorded on a storage medium, including: reading mode information from the storage medium including an object of a first type for reproducing the moving-image information, an object of a second type for providing additional functions related to the moving-image information, and system data for controlling the reproduction of the object of the first and second types, including: information indicating an object to be automatically reproduced when the storage medium is loaded, menu information for displaying a menu, and title information for each object of the first type and the object of the second type, the title information including identification information of the corresponding object, the mode information indicating the type of the corresponding object, determining the type of an object to be reproduced based on the read mode information, and reproducing the object based on the result of the determination.

2 Claims, 5 Drawing Sheets

(56) References Cited

U.S. PATENT DOCUMENTS

| | | |
|---|---|---|
| 5,929,857 A | 7/1999 | Dinallo et al. |
| 6,047,292 A | 4/2000 | Kelly et al. |
| 6,128,712 A | 10/2000 | Hunt et al. |
| 6,580,870 B1 | 6/2003 | Kanazawa et al. |
| 7,313,319 B2 | 12/2007 | Miyauchi |
| 7,346,920 B2 | 3/2008 | Lamkin et al. |
| 2001/0056580 A1 | 12/2001 | Seo et al. |
| 2002/0085833 A1 | 7/2002 | Miyauchi |
| 2003/0086693 A1 | 5/2003 | Chung |
| 2003/0123845 A1 | 7/2003 | Koda et al. |
| 2003/0161615 A1 | 8/2003 | Tsumagari et al. |
| 2004/0042763 A1 | 3/2004 | Morita et al. |
| 2007/0140653 A1 | 6/2007 | Kozuka et al. |

FOREIGN PATENT DOCUMENTS

| | | |
|---|---|---|
| JP | 10-136314 | 5/1988 |
| JP | 10-162018 | 6/1998 |
| JP | 2003-216535 | 7/2003 |
| JP | 2003-249057 | 9/2003 |
| WO | WO 02/05104 | 1/2002 |
| WO | WO 2004/084212 | 9/2004 |

OTHER PUBLICATIONS

Korean Office Action issued on Feb. 25, 2010, in corresponding Korean Application No. 10-2003-0072504 (5 pages).

Communication issued by the European Patent Office on Jun. 12, 2009.

Office Action and Search Report issued by Taiwanese Intellectual Property Office in Taiwanese Patent Application No. 093131109 on Sep. 30, 2008.

European Search Report issued on Apr. 27, 2011, in corresponding European Application No. 10 19 4612 (4 pages).

Japanese Office Action issued Jan. 8, 2013 in counterpart Japanese Application No. 2010-267337: (4 pages, including English translation).

STORAGE MEDIUM STORING MOVING-IMAGE DATA THAT INCLUDES MODE INFORMATION, AND REPRODUCING APPARATUS AND METHOD

CROSS-REFERENCE TO RELATED APPLICATIONS

This application is a continuation of U.S. application Ser. No. 10/964,811, filed on Oct. 15, 2004, which claims the benefit of Korean Patent Application No. 2003-72504, filed on Oct. 17, 2003, in the Korean Intellectual Property Office, the entire disclosure of each of which is incorporated herein by reference for all purposes.

BACKGROUND

1. Field

The following description relates to the reproduction of data stored on a storage medium, and more particularly, to a storage medium storing moving-image data that includes mode information, and a reproducing apparatus and method.

2. Description of the Related Art

Moving-image data recorded on a conventional recording medium includes moving-image information that is compression-encoded and navigation information for controlling the reproduction of the moving-image information.

Specifically, moving-image information includes an audio-visual stream that includes video, audio and/or subtitles, which are encoded according to a motion picture experts group (MPEG) standard. Moving-image information may further include additional information, such as encoding properties of a moving-image stream or an entry point for random access, and a play list, which is an object for arranging the order of reproducing moving-images.

Navigation information includes navigation commands for controlling the reproduction of moving-image information. Examples of the navigation commands include a command to reproduce a play list and a command to jump to another play list.

Generally, navigation information is stored in a table of binary code. Moving-image information can be reproduced with reference to navigation information stored in a storage medium, and a user can watch a high-quality moving-image such as a movie. A group of such navigation commands is called a movie object.

However, programs providing an interactive function, such as games or chatting services, cannot be recorded on the conventional storage medium together with moving-image information. In addition, the conventional storage medium cannot record applications providing a browsing function for retrieving information related to a moving-image being reproduced from a markup document and displaying the information.

In other words, the conventional storage medium on which moving-images are recorded cannot provide additional functions, such as a program function offering interaction with a user and a browsing function for reproducing information related to a moving-image from a markup document.

SUMMARY

Aspects provide a storage medium storing moving-image data that includes mode information, and a reproducing apparatus and method.

According to an aspect, there is provided a storage medium on which data is stored and read by a computer. The data includes at least one object of a first type for reproducing moving-image information; at least one object of a second type for providing additional functions using the moving-image information; and system data for controlling the reproduction of the objects of the first and second types. The system data includes mode information indicating the types of the objects.

The objects of the first type may include the moving-image information that is compression-encoded and navigation information for controlling the reproduction of the moving-image information.

The objects of the second type may further include program data for providing interactive functions. The program data may provide at least one of a game function using a moving-image, a function of displaying a director's commentary while reproducing a portion of the moving-image, a function of displaying information related to the moving-image while reproducing a portion of the moving-image, or a chatting function while reproducing the moving-image. The program data may include an application program interface function for reproducing the moving-image information.

The objects of the second type may include browser data for retrieving information related to a moving-image from a markup document that stores the information and reproducing the information. The browser data may include at least one command implemented in markup language or/and execution script language for retrieving the information from the markup document and reproducing the information.

The system data may include start-up information indicating a position of an object to be first reproduced, and title information for each object. The title information may include entry point information indicating the position of each object and the mode information indicating a mode of each object, and the modes may be classified into a core mode corresponding to the first type, and a browser mode and a program mode corresponding to the second type, according to the types of the objects to be reproduced.

The storage medium can be inserted into or removed from a reproducing apparatus and may be an optical disk from which data can be read and/or recorded using an optical device included in the reproducing apparatus.

According to another aspect, there is provided a reproducing apparatus reproducing moving-image information recorded on a storage medium. The apparatus includes a reader reading at least one object of a first type for reproducing the moving-image information, at least one object of a second type for providing additional functions using the moving-image information, and system data including mode information indicating types of objects and information for controlling the reproduction of the objects of the first and second types; and a reproducer reproducing each object based on the read mode information.

According to another aspect, there is provided a buffer temporarily storing the objects and data read by the reader, and the reproducer may include an application manager controlling the reproduction of each object based on the system data and a blender overlaying images created as a result of reproducing each object into one image.

The reproducer may include a presentation engine decoding the moving-image information, which is compression-encoded and included in the objects of the first type, and reproducing the moving-image information; and a navigation engine controlling the presentation engine based on navigation information for controlling the reproduction of the moving-image information included in the objects of the first type.

The reproducer may include a program engine interpreting program data, which is included in the objects of the second type and is used for providing interactive functions, and executing programs for providing the interactive functions.

The reproducer may further include a browser engine interpreting browser data, which is included in the objects of the second type and is used for retrieving information related to the moving-image from a markup document that stores the information and reproducing the information, the browser engine retrieving the information related to the moving-image from the markup document that stores the information, and reproducing the information.

The application manager may include a user input processor processing user input information and transmitting the user input information to the navigation engine and the presentation engine when the mode information indicates the core mode, to the program engine when the mode information indicates the program mode, and to the browser engine when the mode information indicates the browser mode.

The presentation engine, the browser engine, and the program engine may include a user input executor reproducing the objects using the user input information received from the application manager.

According to another aspect, there is provided a method of reproducing moving-image information recorded on a storage medium. The method includes reading mode information from the storage medium comprising at least one object of a first type for reproducing the moving-image information, at least one object of a second type for providing additional functions using the moving-image information, and system data for controlling the reproduction of the objects of the first and second types and including the mode information indicating types of the objects; determining the type of an object to be reproduced based on the read mode information; and reproducing the object based on the result of the determination.

The method may further include receiving user input information while reproducing the object; and transmitting the user input information to the engine based on the mode information of the object being reproduced and controlling the reproduction of the object.

Other features and aspects may be apparent from the following detailed description, the drawings, and the claims.

Figure 1:
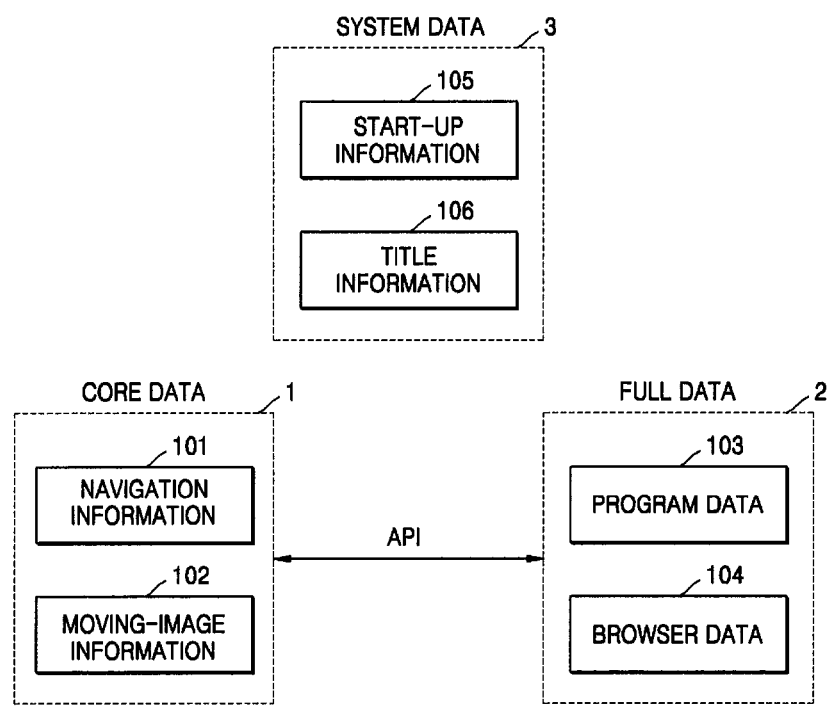
FIG. 1 illustrates types of data recorded on a storage medium according to an embodiment.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

A storage medium according to an aspect may include program data and/or browser data to provide additional functions using moving-image information recorded thereon in addition to reproducing moving-image information and navigation information (hereinafter called "core data") to reproduce moving-images. The storage medium may further include system data that includes mode information indicating types of objects to be reproduced and is required to control the reproduction of each object recorded thereon.

FIG. 1 illustrates types of data recorded on the storage medium according to an aspect. Referring to FIG. 1, the storage medium has core data 1, full data 2, and system data 3 recorded thereon.

The core data 1 is used for reproducing moving-images. The storage medium has at least one object of the core data type recorded thereon for reproducing moving-image information. The core data 1 includes moving-image information 102 that is compression-encoded and navigation information 101 for controlling the reproduction of the moving-image information 102. Therefore, the moving-image information 102 can be reproduced with reference to the navigation information 101 stored in the storage medium, and a user can watch high-quality moving-images such as movies.

The full data 2 is used to provide extra functions in addition to reproducing moving-images. The full data 2 may include program data 103 for providing interactive functions and/or browser data 104 for retrieving information related to a moving-image from a markup document that stores the information and reproducing the information.

The program data 103 may include at least one object that provides a function using moving-images, such as a game function, a function of displaying text while reproducing a portion of a moving-image, such as a director's commentary, a function of displaying additional information while reproducing a portion of a moving-image, or a chatting function while reproducing a moving-image, such as a text-messaging function. To execute a program while reproducing a moving-image, the program data 103 may include an application program interface (API) function for a presentation engine that reproduces moving-image information.

The browser data 104 may include at least one object that includes commands for retrieving information related to a moving-image from a markup document storing the information and commands for reproducing the information. The commands may be markup language and/or execution script language (for example, ECMA scripts). Accordingly, information related to a moving-image can be retrieved from a markup document storing the information and reproduced together with the moving-image.

For example, when a movie has been recorded on the storage medium, information related to the movie, such as the latest news about actors/actresses starring in the movie, events related to the movie, or updated subtitles, which are stored on a web page or in a file, can be retrieved and reproduced together with the movie. The full data 2 may also include other data types for providing additional functions other than reproducing moving-images.

The system data 3 includes start-up information 105 and title information 106. The start-up information 105 indicates the position of an object to be first reproduced by a reproducing apparatus. For example, the start-up information 105 indicates, out of a plurality of objects of the core data 1, the program data 103, and/or the browser data 104 stored in the storage medium, the position of an object that will be first reproduced when the storage medium is inserted into the reproducing apparatus.

The title information 106 includes entry point information indicating the position of each object to be reproduced. Further, the title information 106 may include mode information indicating the data type of each object. Mode information can be classified into a core mode, a browser mode, and a program mode according to the data types of objects.

Figure 2:
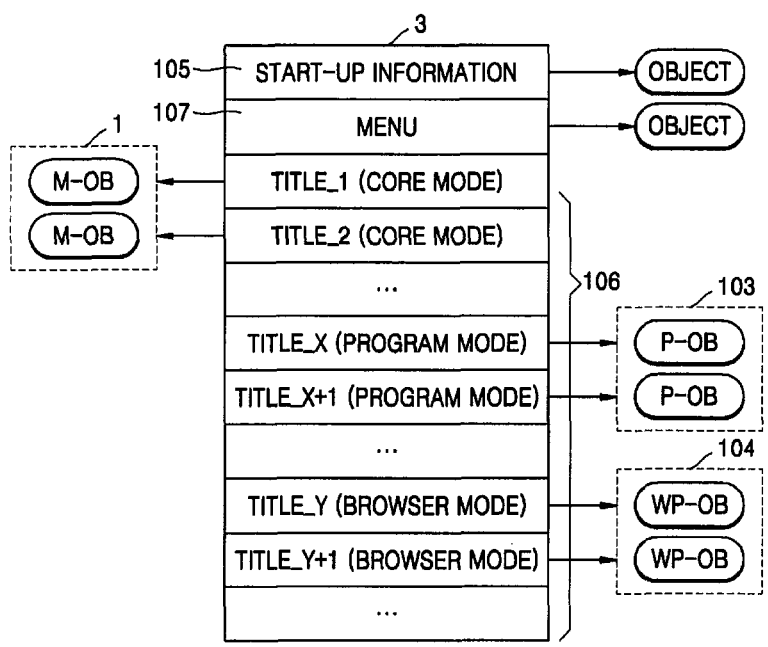
FIG. 2 illustrates a structure of system data illustrated in FIG. 1.

FIG. 2 illustrates a structure of the system data 3 illustrated in FIG. 1. Referring to FIG. 2, the system information 3 includes the start-up information 105 and the title information 106. The system information 3 may further include menu information 107 for displaying menus on a screen.

The start-up information 105 indicates the position of an object to be first reproduced by a reproducing apparatus. The start-up information 105 indicates the address of one of the objects of the core data 1, the program data 103 and/or the browser data 104.

The title information 106 includes control information (title_1 ... title_X+1 ... title_Y+1) needed to reproduce at least one object (M-OB, P-OB, WP-OB, etc.). Objects indicated by the title information 106 may be classified into core-mode objects (included in the core data 1 and hereinafter called "movie objects"), program-mode objects (included in the program data 103 and hereinafter called "program objects"), and/or browser-mode objects (included in the browser data 104 and hereinafter called "web page" objects), according to the object functions.

The movie objects respectively include a plurality of navigation commands for reproducing moving-image information and can be stored in a binary code table. Each of the movie objects includes an identification number, which is an entry pointer indicated by the title information 106. The program objects respectively include programs for providing interactive functions, wherein the file names of the programs may be entry pointers. The web page objects respectively include commands implemented in markup language and/or execution script language, and the file name of a markup document can be an entry pointer.

The title information 106 includes entry point information indicating the position of each object. The title information 106 includes the entry point information indicating the position of each object to be reproduced and mode information indicating the type of each object.

Since each object indicates the position of another object, the objects may be consecutively reproduced. When objects to be reproduced are of the same type, they are reproduced by a reproducing engine without mode conversion. However, when the objects are of different types, mode conversion is required since each object must be reproduced by a different reproducing engine, and a reproducing engine for an object cannot directly call another object in a different mode. In other words, when a reproducing engine is activated (that is, a mode is converted), the activated reproducing engine reproduces a corresponding object.

Figure 3:
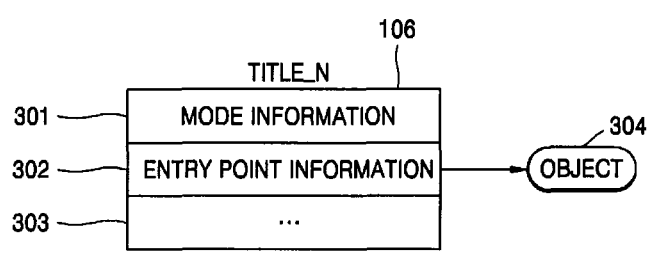
FIG. 3 illustrates a structure of title information included in the system data according to an embodiment.

FIG. 3 illustrates a structure of the title information 106 included in the system data 3 according to an aspect. Referring to FIG. 3, the title information 106 includes mode information 301 and entry point information 302. The mode information 301 can be classified into a core mode, a browser mode, and a program mode according to types of objects to be reproduced. The entry point information 302 indicates the position of an object 304. For example, the object 304 may be located using the entry point information 302 and then reproduced.

As described above, the storage medium stores program data and/or browser data for providing extra functions as well as core data for reproducing moving-images. The storage medium may additionally store system data including mode information for controlling the reproduction of the moving-images. Accordingly, the storage medium can provide a variety of additional functions other than reproducing moving-images. For example, games using moving-images, chatting services, or information related to the moving-images posted on web pages can be provided.

The storage medium may be inserted into or removed from a reproducing apparatus and may be an optical disk that is read by an optical device of the reproducing apparatus. For example, the storage medium may be a CD-ROM, a DVD, or another type of disk.

Figure 4:
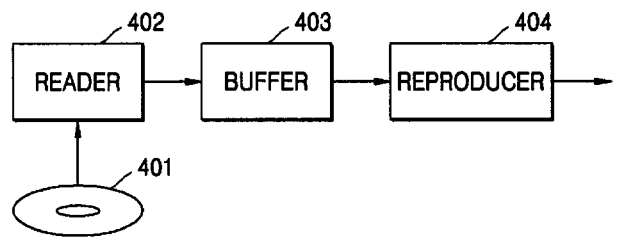
FIG. 4 is a schematic block diagram of a reproducing apparatus according to an embodiment.

A reproducing apparatus for reproducing data stored in a storage medium 401 will now be described. FIG. 4 is a schematic block diagram of the reproducing apparatus according to an aspect. Referring to FIG. 4, the reproducing apparatus includes a reader 402, a buffer 403, and a reproducer 404.

The reader 402 reads data from the storage medium 401. According to another aspect, when the storage medium 401 is an optical disk, the reproducing apparatus includes an optical device that reads data from the optical disk.

The buffer 403 stores the data read by the reader 402. The storage may be temporary. The reproducer 404 reproduces an object using a reproducing engine that corresponds to the object based on the mode information of the object. Then, data reproduced by the reproducing engine is displayed on a display device (not shown).

Figure 5:
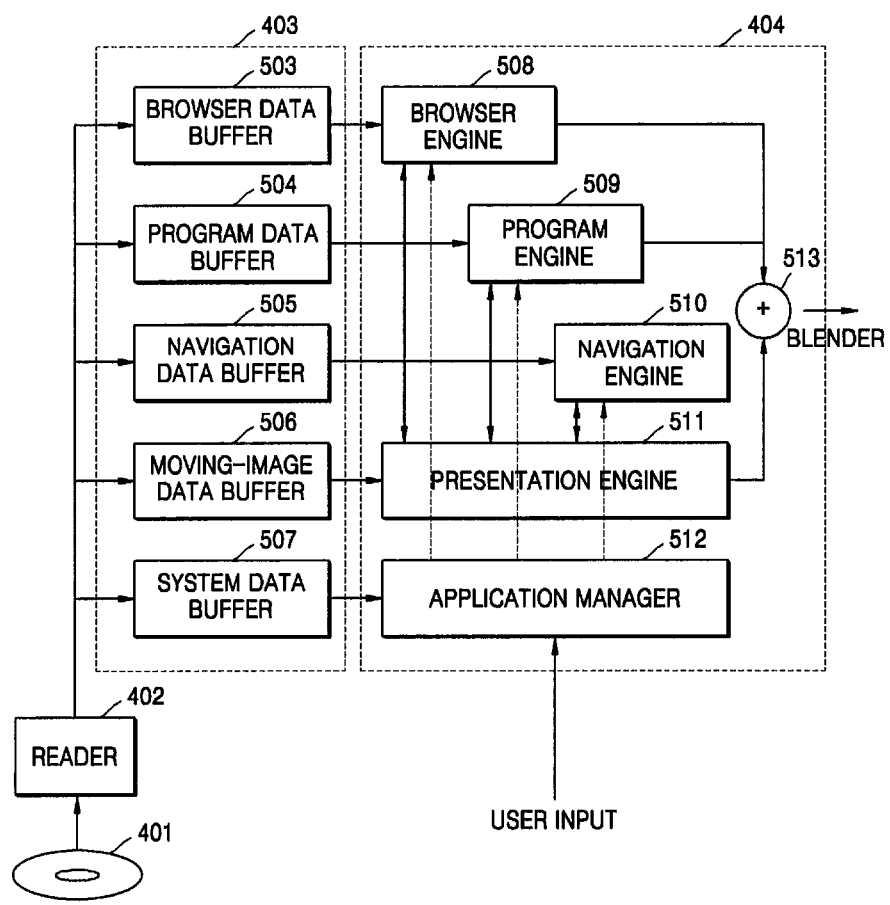
FIG. 5 is a detailed block diagram of a buffer and a reproducer illustrated in FIG. 4.

FIG. 5 is a detailed block diagram of the buffer 403 and the reproducer 404 illustrated in FIG. 4. Referring to FIG. 5, the buffer 403 stores data that is read in a browser data buffer 503, a program data buffer 504, a navigation data buffer 505, a moving-image data buffer 506, and a system data buffer 507 according to the type of data read.

The reproducer 404 includes reproducing engines, an application manager 512, and a blender 513. The reproducing engines have respective reproducing functions that are used according to the types of data temporarily stored. Specifically, the reproducing engines include a browser engine 508, a program engine 509, a navigation engine 510, and/or a presentation engine 511.

The browser engine 508 receives the browser data 104 from the browser data buffer 503, and retrieves information related to moving-image information from a markup document and reproduces the related information. In other words, the browser engine 508 executes a command implemented in a markup language or an execution script language included in the browser data 104. Accordingly, the information related to the moving-image information may be retrieved from the markup document and then reproduced.

The program engine 509 receives the program data 103 from the program data buffer 504 and provides an interactive function. For example, the program engine 509 executes a game, chatting, or director's commentary program. Therefore, it is possible to interact with users using moving-images.

The browser engine 508 or the program engine 509 may provide additional functions with moving-images using an API function for the presentation engine 511 that reproduces moving-images.

The navigation engine 510 receives navigation data from the navigation data buffer 505 and controls the reproduction of moving-image stream data. The presentation engine 511 that reproduces moving-images may be controlled by using the API function which includes commands for reproducing moving-images.

The presentation engine 511 receives the moving-image stream data from the moving-image data buffer 506, and decodes and reproduces the compression-encoded moving-image.

The application manager 512 receives the system data 3 from the system data buffer 507 and controls the reproducing engines to reproduce moving-images and provide additional functions. For example, the application manager 512 locates an object to be first reproduced using the start-up information 105 and reproduces the object. The data types of objects are determined based on the mode information 301 included in the title information 106 of the system data 3, and the reproducing engines corresponding to the data types are activated. The objects are located using the entry point information 302 included in the title information 106 of the system data 3 and reproduced by the activated reproducing engines, respectively.

Referring to FIG. 2, for example, when reproducing title_1 with reference to the system data 3, the application manager 512 reads the mode information 301 included in the title information 106 of the title_1 from the system data buffer 507 and, when the application manger determines that the mode information 301 indicates the core mode, the activation manager activates the presentation engine 511 and the navigation engine 510. The application manager 512 finds the position of an object based on the entry point information 302 contained in the title information 106 and reproduces the object.

When reproducing title_Y, the application manager 512 reads the mode information 301 included in the title information 106 of the title_Y and activates the browser engine 508 when the activation manager determines that the mode information 301 indicates the browser mode. The application manager 512 locates an object based on the entry point information 302 included in the title information 106 and reproduces the object.

The blender 513 overlays graphics reproduced by the browser engine 508, the program engine 509 and/or the presentation engine 511 into one image and outputs the image. Hence, while a moving-image is being reproduced, additional functions, such as the browsing function or the program function, can be provided.

A method of providing the interactive function after receiving a user input while reproducing moving-images will now be described.

Figure 6:
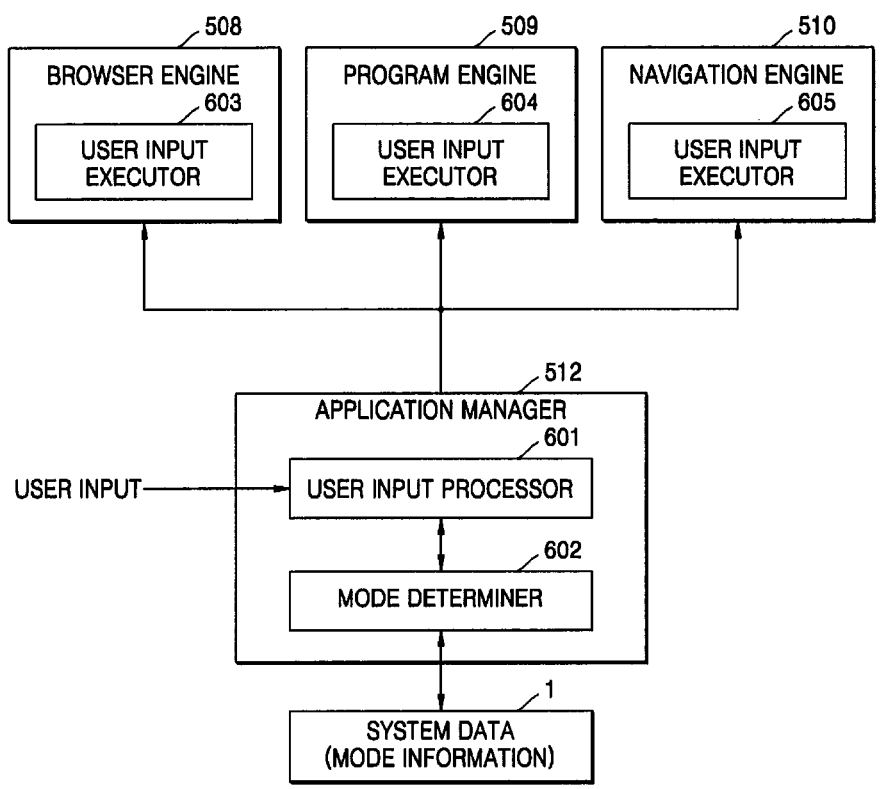
FIG. 6 is a detailed block diagram of a reproducing apparatus according to an embodiment.

FIG. 6 is a detailed block diagram of a reproducing apparatus according to an aspect. Referring to FIG. 6, the application manager 512 includes a user input processor 601 processing information input by a user and a mode determiner 602 determining the data type of an object by reading the mode information 301 included in the title information 106 of the system data 3.

The application manager 512 converts user input information received from the user input processor 601 into a command that a reproducing engine corresponding to the mode information 301 read by the mode determiner 602 can execute and transmits the command to the reproducing engine.

The reproducing engine that receives the command executes the command using a user input executor included in the reproducing engine. For example, when the mode information 301 included in the title information 106 of an object being reproduced indicates the browser mode, the application manager 512 converts user input information into a command that can be executed by a user input executor 603 of the browser engine 508 and transmits the command to the browser engine 508. The same applies to other modes.

Accordingly, user requirements (user input information) are received while a moving-image is being reproduced, and the user requirements can be processed by a reproducing engine appropriate for the mode indicated by the mode information 301 of an object. Therefore, moving-images as well as interactive functions with users can be provided.

Figure 7:
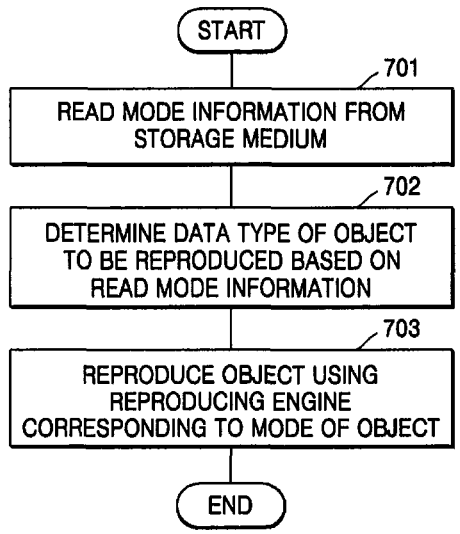
FIG. 7 is a flowchart illustrating a method of reproducing an object according to an embodiment.

A method of reproducing moving-image data that includes the mode information 301 will now be described. FIG. 7 is a flowchart illustrating a method of reproducing an object according to an aspect.

Referring to FIG. 7, the mode information 301 is read from the storage medium 401 (operation 701). The data type of each object to be reproduced is determined based on the read mode information 301 (operation 702). Each object is reproduced by a reproducing engine corresponding to the determined mode of each object (operation 703). The objects can be read during operation 701 or 703 to determine whether they are included in the core data 1, or the program data 103 and/or the browser data 104.

Specifically, at least one object of the core data 1 for reproducing moving-image information, at least one object of the full data 2 for providing additional functions using the moving-image information, and the system data 3 for controlling the reproduction of each of the objects are read from the storage medium 401 (operation 701). The system data 3 includes the mode information 301 indicating the types of objects to be reproduced. The full data 2 can be classified into the program data 103 and the browser data 104 according to functions of the objects included in the full data 2.

Based on the read mode information 301, it is determined whether the objects are included in the core data 1, the program data 103, or the browser data 104, respectively (operation 702). When an object is determined to be included in the core data 1, the object is reproduced by the navigation engine 510 and the presentation engine 511. When the object is determined to be included in the program data 103, the object is reproduced by the program engine 509. When the object is determined to be of the browser data type 104, the object is reproduced by the browser engine 508. The, reproduced images are blended into one image, which is displayed on a display screen (operation 703).

Figure 8:
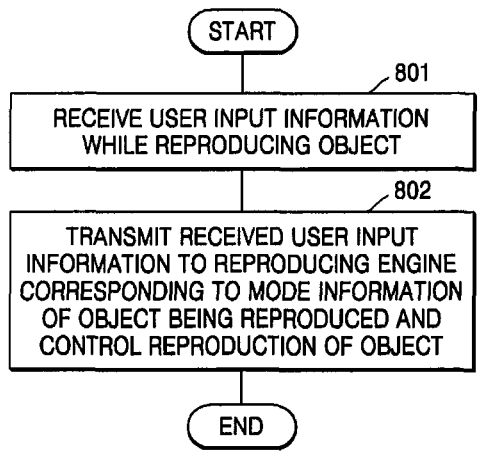
FIG. 8 is a flowchart illustrating a method of reproducing an object that enables interactions with a user according to an embodiment.

A method of processing a user input while a moving-image is being reproduced will now be described. FIG. 8 is a flowchart illustrating a method of reproducing an object that enables interaction with a user according to an aspect.

In operation 801, user input information is received while an object stored in the storage medium 401 is being reproduced. In operation 802, the received user input information is transmitted to a reproducing engine corresponding to a mode of the object that is determined based on the mode information 301, and the reproducing engine reproduces the object.

Specifically, in operation 801, user input information is received to reproduce an object stored in the storage medium 401 that contains the full data 2. the full data includes the program data 103 including at least one object for providing interactive functions and/or the browser data 104 including at least one object for retrieving information related to a moving-image from a markup document and reproducing the information.

According to the mode information 301 included in the system data 3 of an object being reproduced, it is determined whether the object is included in the core data 1, the browser data 104, or the program data 103. The user input information is converted into a command that a reproducing corresponding to the determined mode of the object can execute and the command is transmitted to the reproducing engine. In operation 802, the reproducing engine (the navigation engine 510 and the presentation engine 511), the browser engine 508, or the program engine 509) executes the command according to the user input information (operation 802). For example, the reproducing engine may reproduce the object based on the user input information.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As described above, according to an aspect, the program instructions may be recorded that provide interactive functions, such as games using moving-images being reproduced or chatting services, on a storage medium together with moving-image information.

In addition, applications providing a browsing function for retrieving information related to a moving-image being reproduced from a markup document and displaying the information can be recorded on the storage medium together with the moving-image information.

Therefore, the aspects can provide additional functions, such as a program function for offering interaction and a browsing function for reproducing information related to a moving-image from a markup document.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of reproducing moving-image information recorded on a storage medium, the method comprising:
   reading mode information from the storage medium comprising an object of a first type comprising navigation information for reproducing the moving-image information, an object of a second type comprising program data for providing interactive function related to the moving-image information, and system data for controlling the reproduction of the object of the first and second types, the system data comprising:
   information indicating an object to be automatically reproduced when the storage medium is loaded;
   menu information for displaying a menu; and
   title information for each of the object of the first type and the object of the second type, the title information comprising identification information of the corresponding object and the mode information indicating the type of the corresponding object;
   determining the type of an object to be reproduced based on the read mode information; and
   reproducing the object by loading the object to a first reproducing unit when the object is the first type and loading the object to a second reproducing unit when the object is the second type, based on the result of the determination.

2. The method of reproducing moving-image information as claimed in claim 1, further comprising:
   receiving user input information while reproducing the object;
   transmitting the user input information to the first reproducing unit or the reproducing unit according to the mode information of the object being reproduced; and
   controlling the reproduction of the object.

* * * * *